(12) United States Patent
Hanley

(10) Patent No.: US 6,671,582 B1
(45) Date of Patent: Dec. 30, 2003

(54) FLEXIBLE AGRICULTURAL AUTOMATION

(76) Inventor: Brian P. Hanley, 376 Via Hidalgo, Greenbrae, CA (US) 94904

(*) Notice: Subject to any disclaimer, the term of this patent is extended or adjusted under 35 U.S.C. 154(b) by 0 days.

(21) Appl. No.: 10/228,248

(22) Filed: Aug. 26, 2002

(51) Int. Cl.$^7$ .............................................. G06F 19/00
(52) U.S. Cl. ................ 700/245; 700/258; 700/259; 700/264; 701/28; 701/41; 701/50; 701/213; 701/214; 701/215; 701/300; 342/357.06; 342/357.13; 342/357.17; 342/463; 348/120; 47/58.1 FV; 47/1.01 R; 356/73; 250/339.11; 250/341.2
(58) Field of Search ................ 700/245, 258, 700/259, 264; 701/28, 41, 50, 213, 214, 215, 300; 342/357.06, 357.13, 357.17, 463; 348/120; 47/58.1 FV, 1.01 R; 356/73; 250/339.11, 341.2

(56) References Cited

U.S. PATENT DOCUMENTS

| | | | |
|---|---|---|---|
| 5,974,348 A | * 10/1999 | Rocks | 701/28 |
| 6,052,647 A | * 4/2000 | Parkinson et al. | 701/215 |
| 6,199,000 B1 | * 3/2001 | Keller et al. | 701/50 |
| 6,415,229 B1 | * 7/2002 | Diekhans | 701/214 |
| 6,517,281 B1 | * 2/2003 | Rissi | 404/110 |
| 6,525,276 B1 | * 2/2003 | Vellidus et al. | 177/136 |
| 6,608,672 B1 | * 8/2003 | Shibusawa et al. | 356/73 |

OTHER PUBLICATIONS

Brewer, Automated devices to grow and transplant seedlines, 90, IEEE, pp. 243–248.*
Sistler, Granding agricultural products with machine vision, 90, IEEE, pp. 255–261.*
Ito, Agricultural robots in japan, 90, IEEE, pp. 249–253.*

* cited by examiner

Primary Examiner—William A. Cuchlinski, Jr.
Assistant Examiner—McDieunel Marc

(57) ABSTRACT

Agricultural operations by applying flexible manufacturing software, robotics and sensing techniques to agriculture. In manufacturing operations utilizing flexible machining and flexible assembly robots, work pieces flow through a fixed set of workstations on an assembly line. At different stations are located machine vision systems, laser based raster devices, radar, touch, photocell, and other methods of sensing; flexible robot armatures and the like are used to operate on them. This flexible agricultural automation turns that concept inside out, moving software programmable workstations through farm fields on mobile robots that can sense their environment and respond to it flexibly. The agricultural automation will make it possible for large scale farming to take up labor intensive farming practices which are currently only practical for small scale farming, improving land utilization efficiency, while lowering manpower costs dramatically.

8 Claims, 3 Drawing Sheets

FLEXIBLE AGRICULTURAL AUTOMATION

CROSS REFERENCE TO RELATED APPLICATIONS

Figure 1:
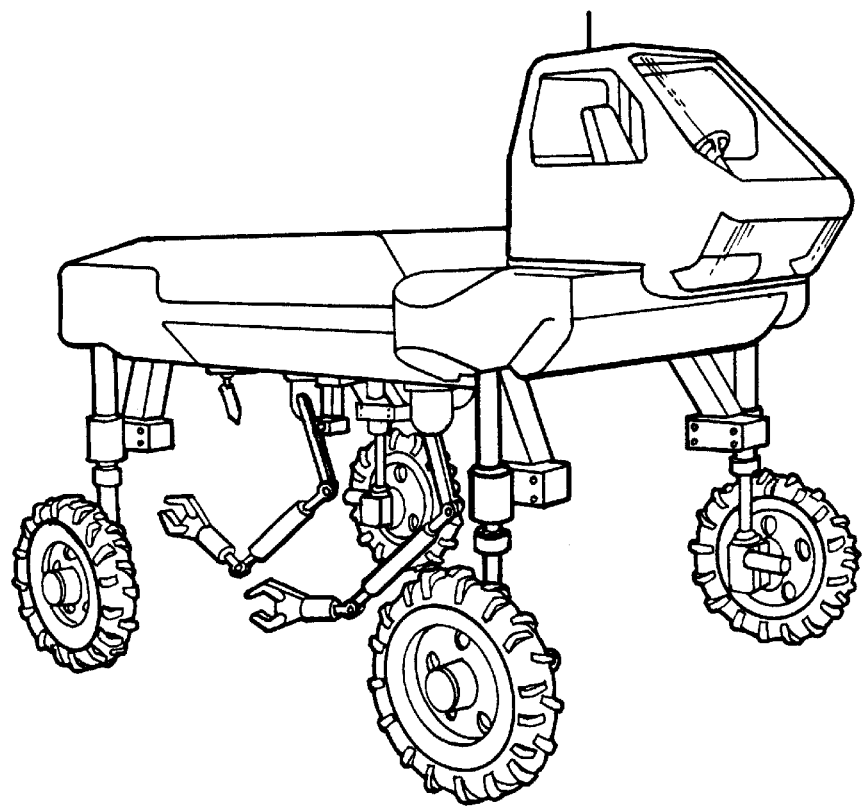

U.S. Pat. No. 5,974,348—System and method for performing mobile robotic work operations The current patent references this as prior art. This patent describes a superficially similar device, but does not contain the three basic elements to a successful flexible automation system, namely: (a) sensing, (b) utilization of sensors by computers or some types of electronics, to (c) adaptively guide robot arms and machinery. Additionally, this prior art makes use of on the ground beacons, and does not provide for a human operator as integral to the operation either locally or remotely.

U.S. Pat. No. 6,052,647—Method and system for automatic control of vehicles based on carrier phase differential GPS.

The current patent may incorporate this patent for controlling the attitude of the robot on uneven terrain.

U.S. Pat. No. 6,199,000—Methods and apparatus for precision agriculture operations utilizing real time kinematic global positioning system systems.

The current patent improves on this prior art by using a combination of sensing and computing to refine the position.

U.S. Pat. No. 6,374,538—Vineyard apparatus, system, and method for vineyard mechanization The current patent improves on this prior art by using robotics, sensing and computing or artificial intelligence techniques and other electronics to provide flexibility and selectivity on a plant by plant basis. The named patent does this by a large number of well designed mechanical attachments.

U.S. Pat. No. 6,415,229—System for position determination of mobile objects, in particular vehicles.

The current patent improves on this prior art by using sensing and computing for guidance in addition to this system.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF INVENTION

1. Field of Invention

This invention relates to the application of integrated flexible robotics techniques from industry to agriculture, specifically to the use of robotic armatures, a computer or artificial intelligence system that can sense and decide before acting on the work object, alerting a human operator where intervention is required coupled with, machine vision, laser rastering, radar, infrared, ultrasound, touch or chemical sensing.

2. Prior Art

The genesis of this invention came with the observation of a problem in agriculture with labor costs. This was confirmed by various scholars such as these who stated: "Because of the increasingly high cost and scarcity of experienced pruners, efforts have been underway since the late 1960s to mechanize grapevine pruning in the United States. To date, these efforts have proved unacceptable because commercial mechanized pruning devices lack selectivity." [University of Michigan Extension, Pruning Grapevines in Michigan, Gordon S. Howell & R. Keith Striegler MSU Department of Horticulture]

This quote summarizes for the viticulture agricultural niche the problems with purely mechanical methods lacking an intelligent robotic component that can sense and decide. Many areas of agriculture today still require large amounts of fairly skilled labor to plant, cultivate, prune, harvest and spray crops. The problem is how to accomplish that? This flexible agricultural robot provides a solution to this class of problem.

U.S. Pat. No. 6,374,538 contains an excellent discussion of the problems with prior art in the area of refined agricultural machinery as it relates to viticulture. This discussion summarizes the drawbacks of a large number of patents granted all of which are purely mechanical methods. This patent, is, to date, the most complete work for purely mechanical methods of viticulture pruning.

All purely mechanical approaches to problems in agriculture such as vineyard or orchard pruning and harvesting, ground crop harvesting or weeding suffer from the inability of mechanical methods to easily adapt to variant conditions without human operator intervention. Vineyards are able to harvest by mechanical methods, and many do. However, mechanical methods are not practical for harvesting of grapes in intact clusters. To date, pruning, harvesting of intact clusters, suckering and tying of vineyards is practiced manually virtually without exception. This is extremely costly for vineyards since it is very labor intensive. The labor-intensive nature of this type of farming also puts the farmers at risk from union activity. Similar problems pertain to fruit orchards, which share a similar business model.

In other situations, for instance in organic farming, weeds must be removed without use of herbicides. This again, results in the farmer making use of a large amount of expensive labor. Organic farming also suffers problems from insect pests that can, in some cases be controlled during critical parts of their life cycle by removal of leaves, and affected material. These types of tasks can never be accomplished by purely mechanical means because purely mechanical methods are not able to intelligently respond to their environment on a selective beyond a very simple level of complexity. In addition, farming in general is receiving greater and greater pressure to minimize use of chemical methods because of environmental issues.

There have been devices, such as that of Slaughter and Lamm at UC Davis in 2000 for machine vision based weed control, which have not been patented. (Found by a thesis search.) However, their system did not control a robot arm, but simply controlled a sprayer, which required precise timing of the motion of the device as it was dragged behind a tractor. Nor did this system perform any but the most rudimentary machine vision operations. They did not attempt to make use of more than one modality for sensing, nor did they consider any of the other elements that make the present invention unique such as intelligent integration of the operator or semi-autonomous limited self guidance during its primary duty execution.

There are other devices, which have been known for a considerable period in industrial automation, which couple robot arms with machine vision for performing tasks, even with a high degree of selectivity, and flexible robot systems which are trainable and easily programmable. However, these are not mobile machines, they are unable to rove around or be steered by an operator. Nor do they incorporate a communications system which allows the experience of each machine to be collated so as to improve the performance of all. Nor, as far as can be determined, have any of these environmentally responsive robotic techniques have been applied to agriculture to date. There are other innovations, such as the use of multiple sensor modalities (i.e. combining machine vision with radar data to produce a better 3 dimensional mapping of an object) which are not typically used in industry, but which can be important in field applications to produce a robust system. Another innovation is the use of GPS incorporated into the robot arms themselves as a way of tracking the motion of the robot's arms.

This is a system integration invention, which brings together in a new way components which are available and used today in various settings, mostly industrial facilities of various kinds. In addition to improving the labor situation, it results in new capacities which are not available now, such as detailed mapping of croplands traversed. Accordingly, this invention is novel and not obvious within the field of agriculture.

Some aspects of this invention, such as the use of GPS to track motion of robot arms are novel within the field of robotics. Another novel aspect of this invention within the field of robotics is the use of a communications system connected to the manufacturer or manufacturer's agent which can be used to collect sensing, decision and error information so that other robots can make use of the solutions created for one to benefit all. Current systems for industry, where they have such communications, use them for maintenance and diagnostics purposes. A probable reason why this aspect of the invention would occur for agriculture first is that robots sold for industrial purposes are sold to widely varying competitors, who use them to execute proprietary designs and trade secrets, consequently, such a feature would not be accepted. Agriculture is structured differently.

It is a highly integrated commodity business with a very high degree of cooperation between producers. Accordingly, there are aspects of this invention which are novel and not obvious within the general field of robotics.

BACKGROUND OF INVENTION—OBJECTS AND ADVANTAGES

The overall object of the invention is to provide a means for replacing human labor on farms in situations where mechanical designs, which cannot make an intelligent decision, will not work. The invention is a flexible robot platform which can be reconfigured by software and changes to attachments. The overall advantages are primarily—the work can be done with a higher degree of precision and repeatability (which translates to higher quality) at a fraction of the current cost. The machine is also flexible and reconfigurable which makes it more widely useful, as CNC machines are in industry. And, that the farmer can have a higher level of information available about his farm than he otherwise would have, which can be reported to him by the machine.

(a) To provide a system that can sense the precise location of crop plants, their branches, stems, and trunks and if necessary their internal structure through the application of machine vision, ultra wide band radar, ultrasound imaging, infrared imaging, laser rastered 3-D surface mapping, chemical and touch sensors. The integration of data from one or multiple channels, and the possible iterative refinement of sensing using multiple means of sensing for areas identified as critical by the robot is a core element of what makes this invention useful and practical for farmers.

(b) To integrate the multi-channel data into a three dimensional map of each plant. This data is then available for the application of algorithms that can determine where a plant should be cut, sprayed, tied, or otherwise manipulated. This provision creates a means for generalized representation.

(c) To provide a subsystem which will determine, based on locations identified in the three-dimensional map of each plant, how to move a robot arm to that location as rapidly as possible. The advantage of this subsystem is to make it eliminate the task of programming each step of the robotic arm movement as is usually done, replacing it with a simple target location.

(d) To provide a subsystem that will perform a specific operation with the arm after it has been moved to the location specified. This operation can be a highly variable scripted operation. The essence of this object to the invention is its configurable application to robotics in agriculture. Its advantage is that it decouples the task of specifying what to do from the task of getting to the location where the task needs to be done.

(e) To provide a utility subsystem consisting of computers, artificial intelligence, or fizzy logic electronics in some combination that can be used to recognize rapidly situations in which the robot finds itself. This system will fail over to an operator display that will allow the operator to look at what the robot is having a problem with so that the operator can provide a solution to this situation. The utility subsystem may record or learn from this solution and be able to use it again the next time that a similar situation is encountered. The advantage of this is that the robot will gain flexibility as it is used and encounters novel situations outside of the bounds thought up by the original system creators. This feature is important to creating a successful roving robot designed to deal with the variability of plants.

(f) To provide a system that will, both automatically and with operator intervention, record the location of each crop plant, along with diagnostic information about the plant. This information is entered into a database that the farmer can browse to take special action in his croplands.

(g) To provide a system that will alert the operator when a situation is encountered that the machine is not entirely sure how to deal with, presenting the information it has available in an optimized fashion for the operator to figure out and decide. These decisions of the operator will be recorded and processed by a learning algorithm.

(h) To provide a system which will allow the operator to see a representation of the field being worked on, and flag, or make notes for future use, about a particular plant or location in the field.

(i) To provide a subsystem which will communicate with a central site data repository via radio, cellular phone, satellite or some other similar technology. Use this link to report:
  a. on the crop data. It also allows the farmer to have his cropland information recorded in a standard shareable form. This can be an important advantage to farms in cooperatives and multi-farm operations comprising tens of thousands of acres across multiple states.

b. any learning overrides that the robot has received from its operator. The advantage of this is that it enables each robot to be used as a learning and refinement station for all other robots in use for that crop. This is a very important advantage for a flexible field robot to have if it is to be successful.

c. on request of the central site, journal records on the detail operation of the computer and AI systems on the robot. The advantage of this is that it allows for iterative refinement of the system using live data from the field. A major problem with such situations is the difficulty involved in getting the data necessary to diagnose and fix problems that arise.

d. movement and use of the robot. This allows the robot to be tracked for liability purposes, and makes it hard to steal the equipment as well. This provides advantages to both manufacturer and farmer for insurance purposes.

e. self diagnostic information from the robot. The advantage of this is that it allows replacement parts and warranty service to be scheduled based on real information rather than just on a schedule since reliability is so important for farmers.

(j) To provide a self powered wheeled or tracked platform vehicle that can be steered by an operator across varying terrain, with the machine providing leveling and fine guidance so that virtually no steering at all is required while operating along a crop row. This simplifies the task of guiding the vehicle greatly, and will prevent the fairly common occurrence of collision of the vehicle with crop plants when an operator makes a mistake. It also makes it possible for the vehicle to be used on a variety of terrain and maintain itself horizontal to the growth of the plants, thereby providing a more useful base for attachment of the robotic arms. This also frees up the operator for the important task of aiding the robot in performing its intended duties should a situation arise which the robot is unable to solve.

(k) To provide a self powered platform that is able to record and repeat a track taken through a field, so that the operator is only required to steer it to the starting point in the field, after which the self powered platform takes over. This simplifies the task of operation and allows the operator to pay attention to exception conditions.

(l) To provide GPS incorporated into the robot arms as a possible means of tracking their motion.

SUMMARY OF THE INVENTION

In accordance with the preferred embodiment of the invention, a robot, with wheels, that contains onboard electronics and sensing equipment which make it possible for the robot to accurately decide where to move attached robotic arms and arm attachments either singularly or as a plurality, which robot can be guided by an operator over rows of crops. The robot contains computer and artificial intelligence hardware and software electronics and algorithms that make decisions customized to each plant or area that is operated on by the robot. The robot uses one or more means of sensing its environment, such as machine vision, ultrawideband radar, ultrasonics, parallax based laser rastering, touch and/or chemical sensing. Depending on the application, it may require more than one sensing technology operating together for acceptable field performance. For example, the robot may require machine vision, radar, and laser raster devices that utilize parallax on the reflection of the laser beam, with all three types of data integrated together by the electronics, to operate reliably in the field. Additionally, it may be useful for the robot to utilize touch sensors to confirm its map of the environment it operates in. Chemical sensors are also useful in some situations to locate and confirm the identity of an agricultural item.

DRAWINGS—FIGURES

FIG. 1—Schematic view from the right front corner of preferred embodiment of the invention assembled.

Figure 2:
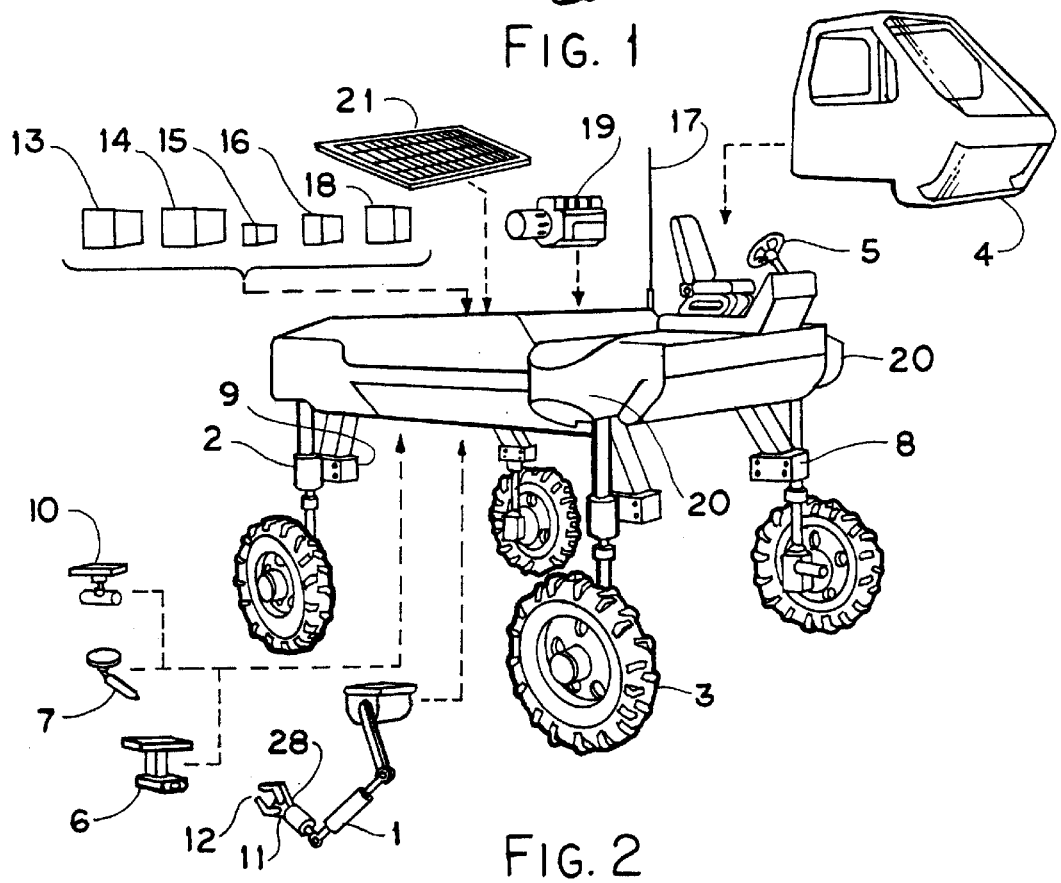

FIG. 2—Explosion view of invention with essential parts.

Figure 3:
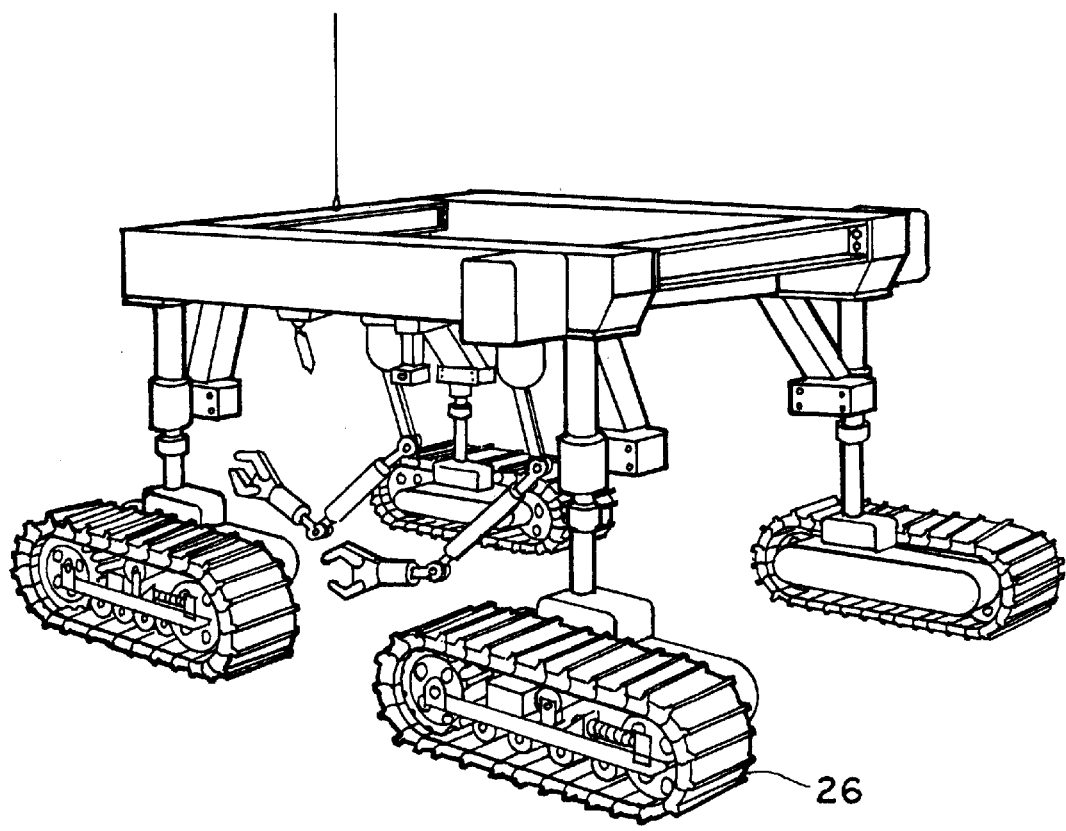

FIG. 3—Schematic view from right front corner of an alternative embodiment which has no cab onboard, and uses track assembly instead of wheels.

Figure 4:
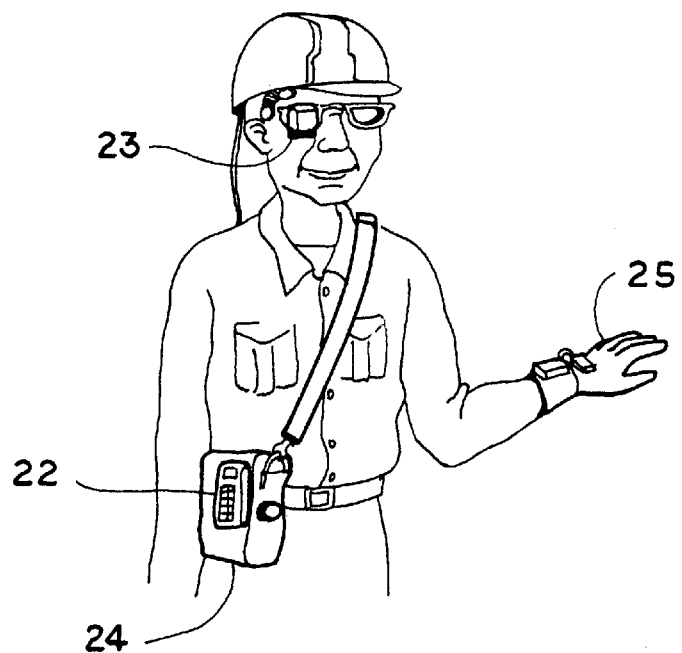

FIG. 4—Schematic of an alternative embodiment of operator controls and display for the invention.

Figure 5:
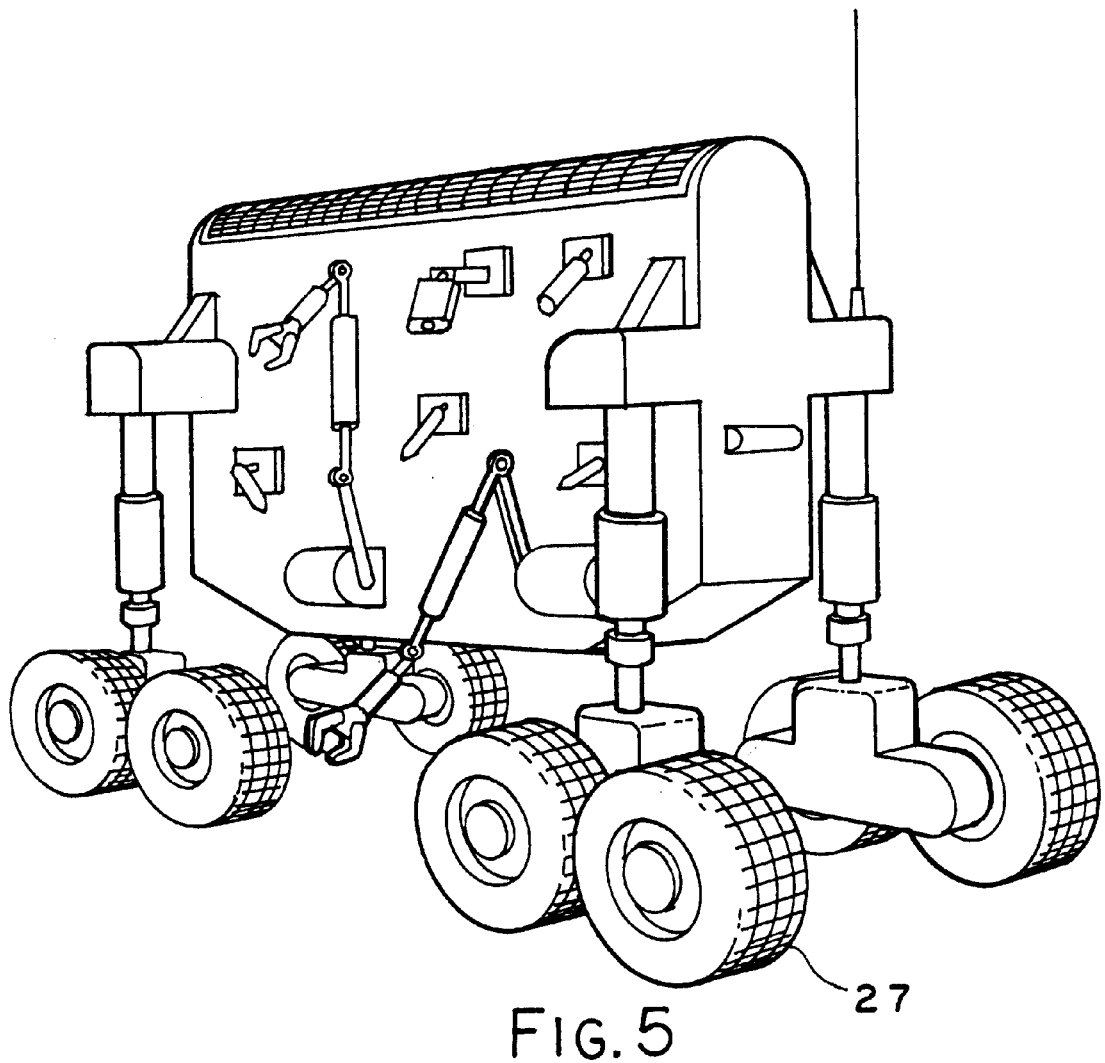

FIG. 5—Schematic of an alternative embodiment which uses multi tire wheel assemblies and low pressure balloon tires.

DETAILED DESCRIPTION—FIGS. 1 AND 2— PREFERRED EMBODIMENT

The robot is a mobile machine which has a location provided for operator control 4. Steering, displays and override controls for instructing the robot are located in the cab 5 in the preferred embodiment.

The machine has steerable legs 20, which can be controlled in a coordinated manner to steer the robot. On each leg is mounted a wheel 3 for moving the machine across the ground.

The legs of the robot may be independently controllable for height 2. This enables the robot to move over angled or uneven terrain while maintaining the sensors and robot arms in a constant orientation relative to crop plants or relevant agricultural work pieces.

Inside the body of the vehicle is located an electrical power supply 19. This is connected electrically to the various electrically powered components of the machine. Also inside the main body of the vehicle is located electronics where some of the computing and similar electronics equipment is placed composed of computer(s) 13 and artificial intelligence electronics 14 as well as other ancillary electronics. The electronics cabinet is connected by appropriate means to the robot arms and sensing devices. FIG. 2 shows a combination of camera 6, laser raster 7, ultrasonic sensor 8, radar 9, touch sensor 12, and chemical sensor 11, and the robot may be constructed with one or more of these alone or in combination in any embodiment. The robot invention may operate while using one or more of the sensor complement that it is constructed with at any time. The robot has one or more robot arms 1, used for operating on the crops.

The robot has a communications module 16, and antenna 7 behind the cab. The communications module is used to send and receive various kinds of information useful for the machine, the operator, or farmer.

The robot has a GPS unit or units 15 used for gross location and recording as it moves, as well as determination of the location of plants.

The robot may use GPS unit or units in the construction of its robot arms for tracking of the location of the robot arm 28 as shown in FIG. 2. This technique can work quite well on a relative basis after a calibration cycle.

The robot has a means of determining its attitude to a high degree of precision 18. There are quite a few alternatives for this part of the robot, including GPS based, gyroscopic, accelerometer and bubble-level systems.

FIGS. 3 THROUGH 5—ADDITIONAL EMBODIMENTS

The operator's station can be replaced entirely by a wireless control system as shown in FIGS. 3 and 4, with only rudimentary controls physically located on the main body of the robot. Display and control mechanism may be portable or wearable, enabling the machine to be controlled by an operator walking nearby, by means of various virtual interaction devices. These may include button or keyboard controls 22, a VR glove 25, a wearable computer 24, a head mounted display, 23. The wearable computer may possibly incorporate a projection display, and it may use other types of interaction devices including machine vision cameras for tracking hand movements, or EMG devices for monitoring musculature directly. (This last option would open up the operation of this robot to people who are severely handicapped, as studies have shown that people with paralysis are capable controlling remote machinery using alternative muscles using EMG electrodes.)

FIGS. 3 AND 5—ALTERNATIVE EMBODIMENTS

The invention can have a wide variety of alternative embodiments. The fundamental configuration could have the operator's station, which is located in the cab of the primary embodiment a the front and center, located almost anywhere on the vehicle (Not shown). The body of the robot may be vertical with the armatures on any side as shown in FIG. 5. Or the robot may have the body split in two with the sides connected by some rigid means similar to FIG. 3. The robot may have a cab 4 of some kind as shown in FIGS. 1 and 2, or it may have some alternative arrangement, perhaps a simple seat with controls, that is not enclosed.

The machine will have alternatives to the wheels shown in FIGS. 1 and 2. Since such a machine is required in some cases to be used where the ground is soft, wheels may be replaced with tracks 26 similar to a tank tread as shown in FIG. 3. Additionally, single wheels may be replaced with multi-wheel assemblies, as shown in FIG. 5, and/or very low pressure "balloon" type tires 27. All of these alternative configurations of means for locomotion are designed to minimize ground abrasion during operation.

The electrical power supply may be a fuel-powered mechanical generator 19; it may also be a fuel cell or chargeable battery with a means for charging. Electrical power could also be supplied by wireless means from a base station to a receiver on the machine using wireless transmission methods. Electrical power could also be supplied by high efficiency solar cells arranged in an array over the top of the machine 21.

The electronics of the sensing system may not use all of the sensor modalities. An embodiment may exist which uses any one of them, or any combination of these types of sensors.

OPERATION

Operation of the invention will be simple from an operator's viewpoint. The operator will seat himself or herself in the cab of the machine, turn it on, and drive it to the place of work. The operator will be able to drive the machine forward, backward, or turn the machine in any direction on the ground.

Once at the place of work, the operator will position the machine approximately over the start of a row, then signal to the machine to begin a selected task. The operator will be able to choose the type of task the machine should perform from a set of tasks which the machine has been programmed to be able to do and learn.

After the robot starts working on a row, the machine will control its speed and direction, until the operator uses the brake or an override cutoff switch. This will allow the operator to concentrate on making sure that the machine is performing its work correctly. As the machine operates, it will display to the operator a representation of the materials it is sensing. It will also show the operator what decisions the robot has made, and the results of those decisions. If the machine finds a situation uncertain, it will stop and alert the operator that it requires intervention, asking the operator for help completing the task which it is having trouble with.

When the machine gets to the end of a row, it will alert the operator and stop running automatically. The operator will then turn the machine around, roughly center it over the next row, and continue.

As the machine is operated, at all times it will maintain its working platform horizontally by using the attitude detection subsystem. The operator will be able to override this and operate each leg manually, or else set all legs to some fixed length. But normal operation will mean that the machine will level itself. As the driver guides the machine across any terrain, the onboard electronics and computer system will automatically level it, as it drives, raising and lowering its legs. By using its leveling legs, the machine will be able to compensate for holes or bumps for single or multiple wheels, as well as for hillside terrain.

As the machine moves along a row, it will receive data from its various sensors. Depending on the crop type and general requirements, there may be only camera information collected. There may be radar data as well, used to help map the three dimensional space, and there may be ultrasonic devices or lasers used as well. This data is integrated by a computer and electronics subsystem to develop a three dimensional map of the objects to be operated on.

Based on the 3 dimensional map of the plant or agricultural work piece that is produced, the computer system makes a decision as to where it should move its robot arm or arms, and the operation to be conducted once a particular arm is moved to the desired position. The robot arms will then be moved to the location decided upon and the operation executed. This is done iteratively for all the plants or workpieces presented, while recording and displaying to the operator representations of the 3-D map, the decisions and operation of the robot arms.

DESCRIPTION AND OPERATION OF ALTERNATIVE EMBODIMENTS

The operator of the machine when it is controlled by a wearable or virtual reality type of device will be able to walk and move around the machine as long as he is within effective communication range. This will enable the operator to be more effective in monitoring the effectiveness of machine operation, as he will be able to walk behind it, closely inspecting the results of operation.

CONCLUSION, RAMIFICATIONS AND SCOPE OF INVENTION

The invention has wide application within agriculture, where many areas still require massive amounts of hand labor for operations from harvesting to tilling. I will not attempt a full accounting here, but will instead give several widely differing examples, which this invention can be applied to, as a sampling of how the machine could be used.

Viticulture—Grapes around the world total over 19 million acres in production. On all of that acreage, several operations are only practical with manual labor. Harvesting of intact grape clusters, pruning of vines, tying of vines to trellises, and suckering (removal of unwanted growth) There is machinery available for pruning, as well as suckering, but it has serious problems in practical use.

Tomato culture—Tomato farms have a serious problem with manual labor requirements since it is not possible to remove weeds that grow in the crop line using either disc or spray techniques. This leads to large hand labor costs.

Organic vegetable farming—All such farming has a serious problem which is the amount of labor required in order to accomplish weed control. The labor involved in cultivation of such crops is a major factor preventing organic farming methods from being used more widely in agriculture.

This invention will have a very positive effect on many aspects of agriculture, as it is a basic enabling technology to allow larger farms to take up the labor-intensive practices of small organic farms on a practical basis. This represents a new capability that is not currently present. In sectors where large amounts of labor have not been possible to eliminate by any means whatsoever, the invention represents an opportunity to achieve very significant savings. This invention in its alternative form can make it possible for disabled people to take up a useful role in agriculture. With appropriate work using haptic and aural feedback devices, this invention could be operated by the blind also.

What is claimed is:

1. A flexible agricultural automation for any type of: pruning, harvesting, weeding, trimming, tying, planting, spraying, pollinating or other operations on plants, comprising:
   (a) a mobile robotic machine mounted on a means of locomotion with controls for guiding the machine by an operator
   (b) one or more types of sensing apparatus mounted on the machine substantially like machine vision, laser raster scanned three-dimensional mapping, microwave radar, ultrasonic, infrared, chemical and touch sensors
   (c) robotic arm or a plurality of robotic arms mounted on the machine which are equipped with means for tracking movement of same
   (d) a means of decision processing substantially like a computer and/or artificial intelligence electronics or simulations of same for and control the movement of robot arm or arms wherein the sensor data are utilized by the computer and/or artificial intelligence electronics to decide how to move the robot arm or arms, as well as guide the machine as a whole when necessary, wherein the robot arm or arms can have varying attachments, and the decision processing may refer ambiguous situations to a human operator for resolution.

2. The flexible agricultural automation of claim 1 may incorporate a GPS in combination with sensing apparatus to provide a means for being self-guiding for part of its operational period.

3. The flexible agricultural automation of claim 1 may incorporate a GPS used in combination with the sensing and computing as a means to determine the location of plants or other agriculturally pertinent items.

4. The flexible agricultural automation of claim 1 may incorporate a component for determining orientation and attitude which component will be used by the machine for maintaining the machine in a specified orientation, which orientation may be changeable by the operator.

5. The flexible agricultural automation of claim 1 may incorporate a communications module for linking the robot to a station located elsewhere which communications module may be used to send and receive information.

6. The flexible agricultural automation of claim 1 can use multiple sensing methods integrated together for sensing environment, wherein the combination of sensing provides a means to achieve robust operation.

7. The flexible agricultural automation of claim 1 can incorporate devices such as head mounted displays, virtual reality glove controls, and similar portable devices for display and control.

8. The flexible agricultural automation of claim 1 can incorporate GPS into the robot armatures to provide a means for locating the arms of the robot.

* * * * *